United States Patent [19]

Harrie et al.

[11] Patent Number: 5,596,833

[45] Date of Patent: Jan. 28, 1997

[54] FLY TRAP CONTAINER

[76] Inventors: Michael R. Harrie; Gary L. Merrill, both of 1215 Zanjero Ct., Mentone, Calif. 92359-9634

[21] Appl. No.: 358,234

[22] Filed: Dec. 16, 1994

[51] Int. Cl.$^6$ ................................................ A01M 1/10
[52] U.S. Cl. .................................................... 43/122
[58] Field of Search ............................ 43/122, 107, 131, 43/121

[56] References Cited

U.S. PATENT DOCUMENTS

| | | | |
|---|---|---|---|
| 637,370 | 11/1899 | Colbassani | 43/131 |
| 855,308 | 5/1907 | Hansen | 43/122 |
| 1,053,714 | 2/1913 | Crichton | 43/122 |
| 1,219,665 | 3/1917 | Rozwud | 43/122 |
| 1,297,894 | 3/1919 | Navrot | 43/122 |
| 1,378,048 | 5/1921 | Maziarz | 43/122 |
| 2,715,295 | 8/1958 | Brown | 43/107 |
| 3,648,778 | 3/1972 | Huthsing, Jr. . | |
| 3,696,916 | 10/1972 | Penniman et al. . | |
| 4,286,389 | 9/1981 | Ogle . | |
| 4,681,740 | 7/1987 | Commarmot et al. . | |

FOREIGN PATENT DOCUMENTS

| | | | |
|---|---|---|---|
| 0545190 | 11/1922 | France | 43/122 |
| 0798387 | 5/1936 | France | 43/131 |
| 0835701 | 12/1938 | France | 43/122 |
| 0070830 | 11/1892 | Germany | 43/122 |

*Primary Examiner*—Joseph J. Hail, III
*Assistant Examiner*—James Miner
*Attorney, Agent, or Firm*—Sheldon & Mak

[57] ABSTRACT

An insect trap includes a vial having an annular reservoir, a bottom opening extending between opposite portions of the reservoir, a transparent upper wall of the vial extending upwardly and inwardly above the reservoir and having an upper opening centrally located in an upwardly extending, centrally located neck portion, the neck portion forming a stopper engagement surface proximate the upper opening; an elongate hook having a stem, a main hook portion connected to an upper extremity of the stem for supporting the hook on an external support, and a secondary hook portion at an intermediate location on the stem portion. A stopper is connected proximate a lower extremity of the hook for supporting the vial and closing the upper opening when the trap is suspended by the hook. The hook sealingly protrudes the stopper, forming an inside hook portion below the stopper for suspending a fixture within the vial. The hook, together with the stopper, is passable vertically through the bottom opening, and the secondary and main hook portions are passable vertically through the upper opening when engaging the hook with the vial.

17 Claims, 1 Drawing Sheet

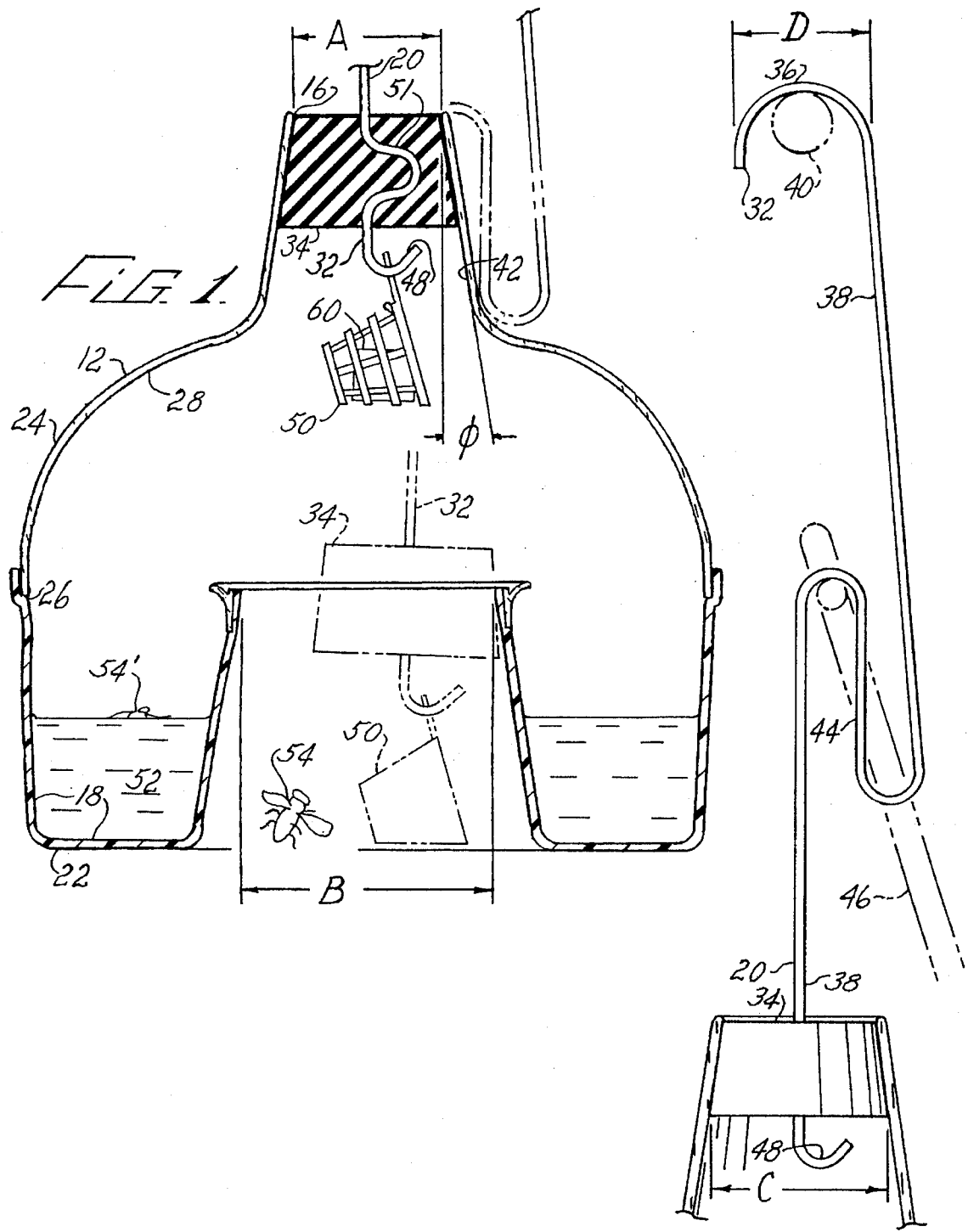

2

FLY TRAP CONTAINER

This application relates to Disclosure Document No. 357,486 that was filed on Jul. 11, 1994.

BACKGROUND

The present invention relates to suspendable containers, and more particularly to such containers adapted for specific uses as insect collectors and the like.

Suspendable containers of the prior art include pails having wire bails hingedly connected thereto, bird feeders having hook appendages upwardly extending therefrom, and planters that hang by macrame and the like. One insect trap of the prior art, known as a Jackson trap, includes a ventilated paper or cardboard housing having solid bait suspended by a basket within the housing, and a hook for supporting the trap from a branch within a fruit tree. The Jackson trap is unsuitable for use with liquid bait, and thus finds limited application such as collecting medfly samples for use in managing quarantine boundaries.

Another insect trap of the prior art, known as a McPhail Bottle, includes a necked glass container having a bottom opening and an annular reservoir surrounding the bottom opening for holding a supply of liquid lure, a domed wall portion of the container extending from an outer extremity of the reservoir upwardly and inwardly to the heck. A flange extends outwardly about the neck for engagement by a wire yoke, a wire bail having an upper hook extremity being hingedly connected to opposite sides of the bail. The neck is sealingly closed by a conventional rubber stopper for confining insects entering the bottom opening to a limited spatial volume above the reservoir. The insects, which are unlikely to fly downwardly through the bottom opening, eventually contact the liquid lure, drowning therein. The McPhail bottle exhibits a number of disadvantages, including:

1. It is awkward to use in that the container is excessively heavy, making the trap difficult to hang in many locations, particularly in that only stout branches of trees and other foliage are sufficiently strong to provide the necessary support;
2. It is dangerous in that the glass is subject to breakage, and the excessive weight is a likely cause of injury to persons nearby in case the trap falls from its support.
2. The stopper is difficult to remove when desired for cleaning and/or refilling the reservoir; and
3. There are no provisions for using solid bait in proximity with the liquid lure.

Thus there is a need for a suspendable bottom-ventilated container that is easy to use, inexpensive to produce, and effective for collecting insects using liquid lure and optionally solid bait.

SUMMARY

The present invention meets this need by providing a suspendable ventilated container including a vial having an annular reservoir, a bottom opening extending between opposite portions of the reservoir, an upper wall of the vial extending upwardly and inwardly above the reservoir and having a centrally located upper opening therein and means for closing the upper opening. In one aspect of the invention, the container includes an elongate hook member having a stem portion, and a downwardly facing main hook portion connected to an upper extremity of the stem portion for supporting the hook member on an external support member; and a stopper member connected proximate a lower extremity of the hook member for supporting the vial, wherein the hook member together with the stopper member is passable vertically through the bottom opening, and the main hook portion of the hook member is passable vertically through the upper opening for supporting the container suspended from the support member with the stopper member engaging the upper wall on opposite sides of the upper opening.

The upper wall can be formed with an upwardly extending, centrally located neck portion, the upper opening being located in the neck portion. The neck portion can form an upwardly and inwardly tapered stopper engagement surface proximate the upper opening, the stopper member engaging the stopper engagement surface when the container is suspended by the hook member. The stopper engagement surface can be conical, the stopper member having a frusto-conical outside surface for sealingly engaging the stopper engagement surface, thereby sealingly closing the upper opening, the stopper member making pressure contact with the stopper engagement surface in response to loading by the vial.

The stopper member can sealingly close the upper opening when the container is suspended by the hook member. The hook member can sealingly protrude the stopper member, the hook member forming an upwardly facing inside hook portion below the stopper member for suspending a fixture within the container. Preferably the stopper member is formed of a resilient material for facilitating the sealing. Preferably the hook member is formed of an elongate high-strength material of uniform cross-section and includes a tab segment within the stopper member for fixedly securing the stopper member on the hook member.

Preferably the hook member includes a downwardly facing secondary hook portion located between the main hook portion and the stopper member for facilitating manipulation of the main hook portion onto the external support member and for supporting the hook member above a bottom extremity of the container with the secondary hook portion engaging the upper wall when the container is not being suspended by the hook member.

The container of the present invention is particularly suitable for use as an insect trap or collector. Preferably the upper wall is formed of a transparent material for admitting ambient light into the vial, thereby attracting the insects upwardly from the bottom opening once they have entered the vial.

In another aspect of the invention, an insect trap includes the container in combination with a material for immobilizing insects in the reservoir.

In a further aspect of the invention, a method for trapping insects includes the steps of:

(a) providing a ventilated vial having upper and lower openings, an annular reservoir surrounding the lower opening, an upper wall extending over the reservoir to the upper opening;

(b) loading the reservoir with a material effective for immobilizing insects;

(c) providing a hook assembly having an upper downwardly facing hook portion and a stopper portion spaced below the hook portion;

(d) passing the hook assembly upwardly through the lower opening;

(e) passing the hook portion upwardly through the upper opening with the stopper portion supportively contacting the upper wall on opposite sides of the upper opening;

(f) suspending the container by the hook assembly with the hook portion being supported by an external member; and (g) drawing insects into the vial, the insects passing upwardly through the lower opening and being immobilized in the reservoir.

The step of drawing insects into the vial can include the steps of:

(a) providing a ventilated fixture;

(b) loading a bait body into the fixture for producing attractant vapors emanating from the fixture; and (c) suspending the fixture within the vial.

The steps of loading the reservoir and drawing the insects can include including a lure substance with the material for immobilizing the insects.

DRAWINGS

These and other features, aspects, and advantages of the present invention will become better understood with reference to the following description, appended claims, and accompanying drawings, where:

FIG. 1 is a partial sectional elevational view of a fly trap container according to the present invention; and FIG. 2 is a fragmentary sectional elevational view showing an upper portion of the container of FIG. 1.

DESCRIPTION

The present invention is directed to a suspendable bottom-ventilated container that is particularly suitable for trapping and collecting insects. With reference to FIGS. 1 and 2 of the drawings, a container 10 according to the present invention includes a vial 12 having a lower or bottom opening 14, an upper opening 16, an annular reservoir 18 extending about the bottom opening, and a hook assembly 20 supportively engaging the vial 12 and sealingly closing the upper opening 16. The bottom opening 14 and the reservoir 18 are formed in a base member 22 of the vial 12, a cover member 24 sealingly connecting the base member 22 along a joint 26, the joint 26 being proximate an outer extremity of the reservoir 18. The cover member 24 includes a wall portion 28 that extends upwardly and inwardly from the joint 26, a neck portion 30 smoothly joining the wall portion 28 and extending upwardly and slightly inwardly, terminating at the upper opening 16.

The hook assembly 20 includes an elongate hook member 32 that is preferably formed of high strength wire, and a stopper 34 that is fixedly connected in an inverted orientation to the hook member 32 near a bottom extremity thereof. An upper extremity of the hook member 32 is formed with a downwardly facing main hook portion 36, a stem portion 38 extending between the hook portion 36 and the stopper 34. The hook assembly 20 is configured for supporting the vial 12 from an external support 40 with the stopper 34 sealingly closing the upper opening 16 by compressively engaging a conical inside surface 42 of the neck portion 30. As shown in the drawings, the upper opening 16 has an inside diameter A, the bottom opening 14 having a diameter B that is larger than the diameter A. The outside of the stopper 34 has a frusto-conical shape corresponding to the inside surface 42 and extending to a stopper diameter C that is greater than the diameter A but less than the diameter B, the inside surface 42 being tapered at an angle φ from a cylindrical reference. Further, the main hook portion 36 is formed with an outside diameter D that is less than the diameter A for permitting the hook assembly including the stopper 34 to pass upwardly through the bottom opening 14, the main hook portion 36 also passing through the upper opening 16, the vial 12 being supported on the hook assembly 20 by compressive loading between the stopper 34 and the inside surface 42 of the neck portion 30 of the cover member 24.

Preferably the stem portion 38 is formed with a downwardly facing secondary hook portion 44 for engagement by a hangar implement 46 as shown by dashed lines in FIG. 2 for facilitating placement of the container 10 with the main hook portion 36 engaging the support 40. Also, the secondary hook portion 44 can support the hook assembly 20 with the bottom of the hook member 32 resting above a bottom extremity of the vial 12 as shown by dashed lines in FIG. 1 when the hook assembly 20 is not supporting the vial 12. Further, an upwardly facing inside hook portion 48 is formed at the bottom of the hook member 32, beneath the stopper 34, for supporting a fixture 50 within the vial 12, the fixture 50 also resting above the bottom of the vial 12 when the secondary hook portion 44 engages the top of the neck portion 30. This configuration of the hook assembly 20 advantageously facilitates servicing and other handling of the container 12 without subjecting the fixture 50 to being dislodged by contact with objects under the vial 12. As shown in FIG. 1, the stem portion 38 is formed to include a tab segment or portion 51 within the stopper 34 for locking the stopper 34 onto the hook member 32.

As thus described, the container 12 of the present invention is particularly effective as an insect trap or collector. As shown in the drawings, the reservoir 18 can hold a liquid lure substance 52 such as an aquatic mixture of brewer's yeast and borax that is known to attract flies as depicted by a fly 54 in FIG. 1. The fly 54 enters the vial 12 by upwardly traversing the bottom opening 14, being likely eventually to contact and drown in the lure substance 52 as indicated at 54'. Flies 54 tend to collect in the reservoir 18 in response to attraction by the lure substance 52 in combination with a natural resistance to fly downwardly through the bottom opening 14. Also, an inside reservoir wall portion 56 of the base member is provided with an upwardly and outwardly extending ring member 58 for preventing fluid spillage from the reservoir 18. Fluid spillage is preferably avoided for preventing the flies 54 from being attracted to lure external of the vial 12. Also, the ring member 58 is effective for directing the flies 54 away from the bottom opening 14 and toward the lure substance 52, in that flies 54 that might crawl upwardly on the ring member 58 after contacting the lure substance 52 are likely to fall back into the reservoir 18.

The fixture 50, which can be suspended within the vial 12 as described above, holds a bait body 60, the fixture 50 having an open mesh configuration for passing vapors emanating from the body 60. The use of the fixture 50 with the bait body 60 in the container 12 in combination with the lure substance 52 advantageously augments the effectiveness of the container 12 as a trap/collector of insects. Also, the bait body 60 can be formulated for attracting specific species and subcategories of insects. For example, a pheromone trap product suitable for attracting male medflies in use as the bait body 60 is available as MAGNET™ Trimedlure from AgriSense of Fresno, Calif. A small lure basket model TR-0001-25 suitable for use as the fixture 50 is also available from AgriSense.

A suitable material for the base member 22 of the vial 12 is an acrylic plastic, preferably pigmented bright yellow for attracting flies or other insects. Preferably the cover member 24 is optically transparent for admitting light into the vial 12, and for facilitating visual monitoring of the contents thereof. More importantly, once the insects have entered the vial 12, they are attracted upwardly away from the bottom opening 14 by the ambient light entering through the cover member 24, thereby increasing the effectiveness of the container 10 as an insect trap or collector. The cover member 24 can be bonded to the base member 22 by a suitable conventional solvent or adhesive. An exemplary configuration of the vial 12 as shown in the drawings can have an overall diameter between approximately 7 inches and approximately 8 inches, and an overall height between approximately 8 inches and approximately 9 inches. Correspondingly, the hook assembly 20 can have an overall length of approximately 10 inches. In this approximate size, the inside diameter A of the upper opening 16 can be approximately 1.8 inches; the diameter B of the bottom opening 14 can be approximately 3 inches; the outside diameter C of the stopper 34 can be approximately 2 inches, the angle φ being approximately 9°, and the overall diameter D of the main hook portion 36 can be approximately 1.7 inches. The stopper 34 can be molded in situ on the hook member 32 from a suitable material such as polyvinylchloride (PVC).

Although the present invention has been described in considerable detail with reference to certain preferred versions thereof, other versions are possible. For example, the stopper 34 can be formed from a conventional rubber stopper, modified with a centrally located, tight-fitting passage therethrough for receiving a straight-configured lower portion of the stem portion 38, the inside hook portion 48 being formed after assembly with the stopper 34. Also, a lower portion of the passage can be enlarged for receiving the tab portion 51, thereby locking the stopper 34 against downward movement on the hook member 32. Therefore, the spirit and scope of the appended claims should not necessarily be limited to the description of the preferred versions contained herein.

What is claimed is:

1. In a suspendable ventilated container including a vial having an annular reservoir, a bottom opening extending between opposite portions of the reservoir, an upper wall of the vial extending upwardly and inwardly above the reservoir and having a centrally located upper opening therein and means for closing the upper opening, the improvement comprising:

(a) an elongate hook member having a stem portion, and a downwardly facing main hook portion connected to an upper extremity of the stem portion for supporting the hook member on an external support member; and (b) a stopper member connected proximate a lower extremity of the hook member for supporting the vial, wherein the hook member together with the stopper member is passable vertically through the bottom opening, and the main hook portion of the hook member is passable vertically through the upper opening for supporting the container suspended from the support member with the stopper member engaging the upper wall on opposite sides of the upper opening.

2. The container of claim 1, wherein the upper wall is formed with an upwardly extending, centrally located neck portion, the upper opening being located in the neck portion.

3. The container of claim 2, wherein the neck portion forms an upwardly and inwardly tapered stopper engagement surface proximate the upper opening, the stopper member engaging the stopper engagement surface when the container is suspended by the hook member.

4. The container of claim 3, wherein the stopper engagement surface is conical, the stopper member having a frusto-conical outside surface for sealingly engaging the stopper engagement surface, thereby sealingly closing the upper opening, the stopper member making pressure contact with the stopper engagement surface in response to loading by the vial.

5. The container of claim 1, wherein the stopper member sealingly closes the upper opening when the container is suspended by the hook member.

6. The container of claim 1, wherein the hook member sealingly extends through the stopper member, the hook member forming an upwardly facing inside hook portion below the stopper member for suspending a fixture within the container.

7. The container of claim 6, wherein the stopper member is formed of a resilient material for facilitating the sealing.

8. The container of claim 7, wherein the hook member is formed of an elongate high-strength material of uniform cross-section, the hook member including a tab segment within the stopper member for fixedly securing the stopper member on the hook member.

9. The container of claim 1, wherein the hook member includes a downwardly facing secondary hook portion, the secondary hook portion being located between the main hook portion and the stopper member for facilitating manipulation of the main hook portion onto the external support member and for supporting the hook member above a bottom extremity of the container with the secondary hook portion engaging the upper wall when the container is not being suspended by the hook member.

10. The container of claim 9, further comprising an upwardly facing hook rigidly depending from the stopper member, and a fixture for suspension by the hook, the fixture resting above the bottom of the container when suspended from the hook and when the secondary hook portion engages the upper wall of the container.

11. The container of claim 1, wherein the upper wall is formed of a transparent material.

12. An insect trap comprising the container of claim 1 in combination with a material for immobilizing insects in the reservoir.

13. A method for trapping insects, comprising the steps of:

(a) providing a ventilated vial having upper and lower openings, an annular reservoir surrounding the lower opening, an upper wall extending over the reservoir to the upper opening;

(b) loading the reservoir with a material effective for immobilizing insects;

(c) providing a hook assembly having an upper downwardly facing main hook portion and a stopper portion spaced below the main hook portion;

(d) passing the hook assembly upwardly through the lower opening;

(e) passing the main hook portion upwardly through the upper opening until the stopper portion supportively contacts the upper wall on opposite sides of the upper opening;

(f) suspending the container by the hook assembly with the main hook portion being supported by an external member; and (g) drawing insects into the vial, the insects passing upwardly through the lower opening and being immobilized in the reservoir.

14. The method of claim 13, wherein the step of drawing insects into the vial comprises the steps of:

(a) providing a ventilated fixture;

(b) loading a bait body into the fixture for producing attractant vapors emanating from the fixture;

(c) suspending the fixture within the vial.

15. The method of claim 14, wherein the hook assembly includes an upwardly facing hook portion below the stopper portion, and the step of suspending the fixture within the vial comprises the further step of suspending the fixture from the upwardly facing hook portion before the step of passing the main hook portion upwardly through the upper opening until the stopper portion supportively contacts the upper wall.

16. The method of claim 13, wherein the steps of loading the reservoir and drawing the insects comprises including a lure substance with the material for immobilizing the insects.

17. An insect trap comprising:

(a) a vial having an annular reservoir, a bottom opening extending between opposite portions of the reservoir, a transparent upper wall of the vial extending upwardly and inwardly above the reservoir and having an upper opening centrally located in an upwardly extending, centrally located neck portion, the neck portion forming an upwardly and inwardly tapered conical stopper engagement surface proximate the upper opening;

(b) an elongate hook member having a stem portion, a downwardly facing main hook portion connected to an upper extremity of the stem portion for supporting the hook member on an external support member, and a downwardly facing secondary hook portion at an intermediate location on the stem portion; and (c) a stopper member connected proximate a lower extremity of the hook member for supporting the vial, the stopper member having a frusto-conical outside surface for sealingly engaging the stopper engagement surface when the trap is suspended by the hook member, thereby sealingly closing the upper opening, the stopper member making pressure contact with the stopper engagement surface in response to loading by the vial, the hook member sealingly protruding the stopper member and forming an upwardly facing inside hook portion below the stopper member for suspending a fixture within the vial, the secondary hook portion being located between the main hook portion and the stopper member for facilitating manipulation of the main hook portion onto the external support member and for supporting the hook member and the fixture above a bottom extremity of the trap with the secondary hook portion engaging the upper wall when the trap is not being suspended by the hook member, wherein the hook member together with the stopper member is passable vertically through the bottom opening, and the secondary and main hook portions of the hook member are passable vertically through the upper opening for supporting the trap suspended from the support member with the stopper member engaging stopper engagement surface.

* * * * *